(12) United States Patent
Rider

(10) Patent No.: US 7,104,737 B1
(45) Date of Patent: Sep. 12, 2006

(54) PIPE BEVELING TOOL AND METHOD

(76) Inventor: Rick Shane Rider, R.R. 1 Box 225B, Bronaugh, MO (US) 64728

( * ) Notice: Subject to any disclaimer, the term of this patent is extended or adjusted under 35 U.S.C. 154(b) by 0 days.

(21) Appl. No.: 11/083,523

(22) Filed: Mar. 18, 2005

(51) Int. Cl.
  *B23B 35/00* (2006.01)
  *B24D 15/02* (2006.01)

(52) U.S. Cl. .................. 408/1 R; 408/227; 451/552; 451/557

(58) Field of Classification Search .............. 408/199, 408/211, 227, 1 R, 231; 451/523, 524, 552, 451/557
See application file for complete search history.

(56) References Cited

U.S. PATENT DOCUMENTS

| | | | | |
|---|---|---|---|---|
| 1,662,936 A | * | 3/1928 | Philipp | .................. 82/173 |
| 2,816,352 A | * | 12/1957 | Andler | .................. 408/155 |
| 3,137,208 A | * | 6/1964 | Andler | .................. 408/211 |
| 3,232,145 A | * | 2/1966 | Wilson | .................. 408/202 |
| 3,431,646 A | | 3/1969 | Young | .................. 30/98 |
| 3,540,328 A | | 11/1970 | Foss | .................. 144/205 |
| 3,540,329 A | | 11/1970 | Gill | .................. 144/205 |
| 3,636,803 A | | 1/1972 | Miller | .................. 82/4 |
| 3,744,356 A | | 7/1973 | Slator et al. | .................. 82/4 |
| 3,748,933 A | | 7/1973 | De Shazor | .................. 82/4 |
| 3,754,832 A | * | 8/1973 | Stickler | .................. 408/227 |
| 3,872,748 A | | 3/1975 | Bjalme et al. | .................. 82/4 |
| 3,875,832 A | | 4/1975 | Mayfield | .................. 82/4 |
| 4,001,982 A | * | 1/1977 | Griffin et al. | .................. 451/552 |
| 4,180,358 A | | 12/1979 | Uribe | .................. 409/179 |
| 4,229,129 A | * | 10/1980 | Schaenzer | .................. 408/228 |
| 4,257,289 A | | 3/1981 | Groothius | .................. 82/4 |
| 4,287,796 A | * | 9/1981 | Palmer | .................. 82/113 |
| 4,362,446 A | * | 12/1982 | Bell | .................. 408/211 |
| 4,678,380 A | * | 7/1987 | Zahuranec et al. | .................. 408/211 |
| 4,693,643 A | | 9/1987 | Heyworth | .................. 408/82 |
| 4,955,165 A | | 9/1990 | Brooks et al. | .................. 51/331 |
| 5,004,383 A | * | 4/1991 | Elliott, Jr. | .................. 408/211 |
| 5,551,111 A | * | 9/1996 | Murphy | .................. 7/138 |
| 6,146,067 A | | 11/2000 | Owens | .................. 409/179 |
| 6,835,029 B1 | * | 12/2004 | Salzer | .................. 408/1 R |

FOREIGN PATENT DOCUMENTS

| | | | | |
|---|---|---|---|---|
| DE | 19644630 A1 | * | 1/1998 | |
| JP | 2001179537 A | * | 7/2001 | |
| JP | 2002239825 A | * | 8/2002 | |
| WO | WO 9217304 A1 | * | 10/1992 | |
| WO | WO 2004016393 A1 | * | 2/2004 | |

\* cited by examiner

*Primary Examiner*—Daniel W. Howell
(74) *Attorney, Agent, or Firm*—Martin & Associates, L.L.C.; Derek P. Martin

(57) ABSTRACT

A hand-held pipe beveling tool makes the job of manually beveling the ends of plastic pipe very simple and easy to perform. The pipe beveling tool includes a frame that defines an opening for receiving the end of a pipe. One or more pipe forming members are coupled to the frame to contact the end of the pipe when the pipe beveling tool is used. A user uses the pipe beveling tool of the preferred embodiments by placing the opening of the pipe beveling tool over the end of a pipe, grasping one or more handles on the pipe beveling tool, and rotating the pipe beveling tool while pushing the pipe beveling tool against the end of the pipe. As a result, the end of the pipe is beveled, making the installation of a splice on the end of the pipe much easier to perform.

16 Claims, 6 Drawing Sheets

PIPE BEVELING TOOL AND METHOD

BACKGROUND OF THE INVENTION

1. Technical Field

This invention generally relates to hand tools, and more particularly relates to hand tools for beveling the edges of a pipe.

2. Background Art

Most plumbing systems today use plastic pipes. Polyvinyl chloride (PVC) is the most common type of plastic pipe in use at the current time to supply fresh water. When a water line breaks and causes a leak, a repair crew must dig a hole near the suspected leak, uncover the pipe at the location of the leak, and repair the damaged pipe by replacing the damaged portion of pipe with a good portion of pipe. This is typically done by uncovering a section of pipe that includes good pipe on both sides of the damaged portion, hand excavating underneath the pipe, the using a hack saw to cut the pipe in two places to remove the damaged section of pipe. A good section of pipe is then cut to replace the damaged section, and splices are used to attach the existing pipe to the new replacement section of pipe.

The process of installing the new section of pipe and the splices is made much easier if the ends of the cut pipe sections are beveled. By beveling the ends of the pipe, a splice goes on the pipe much easier. Most pipe repair crews use a large, hand-held file to bevel the edges of the pipe. This, however, is an inefficient process, because the space in a trench is typically limited, making the use of a large file difficult. In addition, using a hand-held file results in a bevel that is usually not even around the perimeter of the end of the pipe. Without a way to more efficiently bevel the end of a pipe, the repairing of plastic pipe will continue to be a manual and difficult process.

DISCLOSURE OF INVENTION

According to the preferred embodiments, a hand-held pipe beveling tool makes the job of manually beveling the ends of plastic pipe very simple and easy to perform. The pipe beveling tool includes a frame that defines an opening for receiving the end of a pipe. The pipe beveling tool also includes one or more pipe forming members that contact the end of the pipe. A user uses the pipe beveling tool of the preferred embodiments by placing the opening of the pipe beveling tool over the end of a pipe, grasping one or more handles on the pipe beveling tool, and rotating the pipe beveling tool while pushing the pipe beveling tool against the end of the pipe. As a result, the end of the pipe is beveled, making the installation of a splice much easier to perform.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 9:
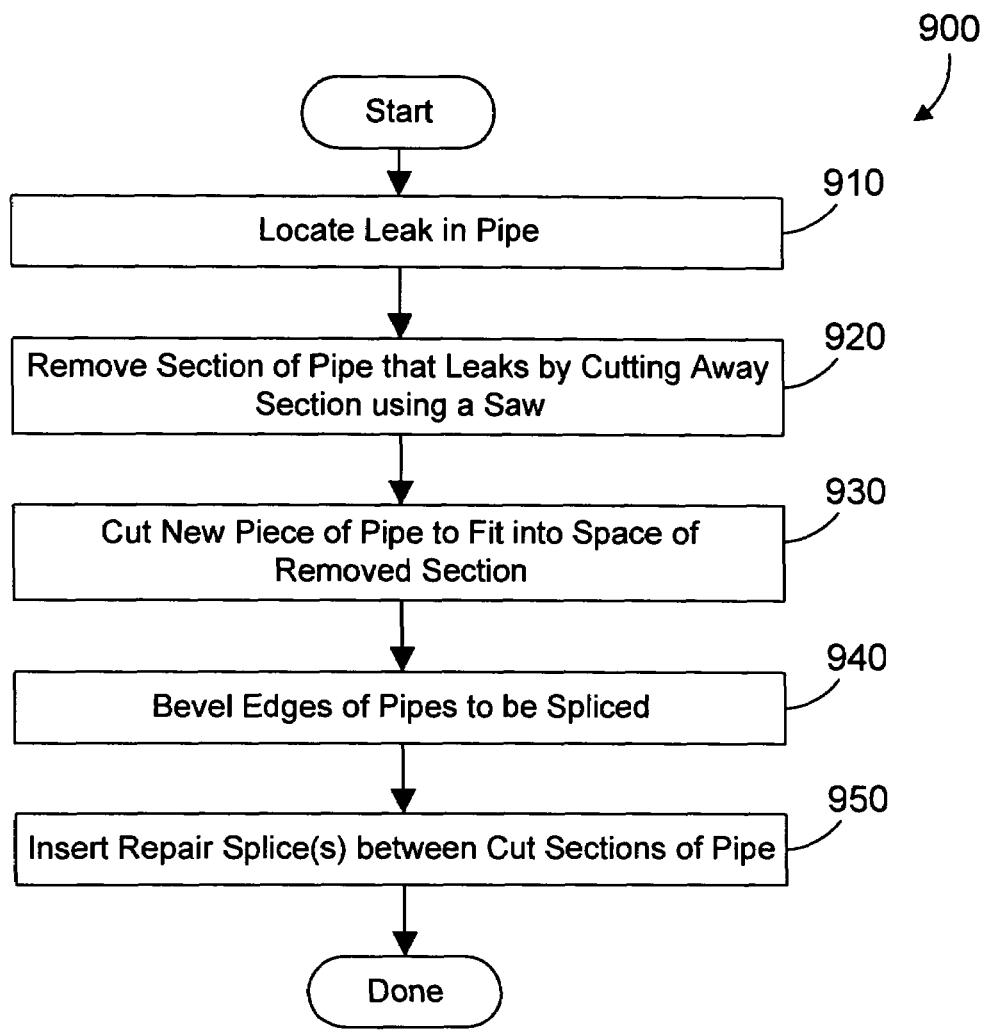
FIG. 9 is a flow diagram of a prior art method for repairing a leak in a plastic pipe.

Before presenting the preferred embodiments herein, it is helpful to review known methods for repairing a leak in a plastic pipe. Referring to FIG. 9, a prior art method 900 begins by locating a leak in the pipe (step 910). The section of pipe that leaks is then removed by cutting away a section of the pipe using a saw (step 920). A new piece of pipe is then cut to fit where the section of pipe was removed (step 930). The edges of the sections of pipe to be spliced are then beveled (step 940). Repair splices are then installed between the ends of the old pipe and the ends of the new piece of pipe (step 950). The reason for beveling the edges of the pipe in step 940 is to make it easier to insert the pipes into the splices. In most cases, the edges of each pipe are beveled, which means the person making the repair must bevel four pipe ends, the two ends of the existing pipe that are still in the ground, and the two ends of the new piece of pipe that was cut to replace the damaged section of pipe that was removed.

Figure 10:
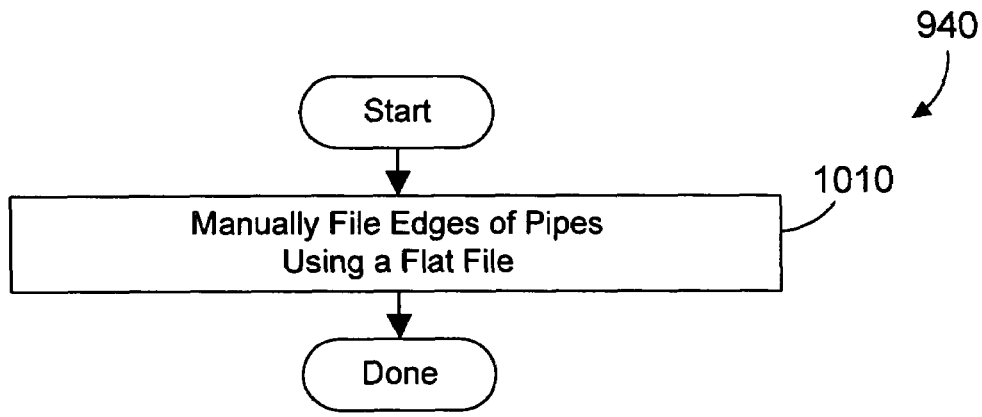
FIG. 10 is a flow diagram showing a first known implementation of step 940 in FIG. 9.
Figure 11:
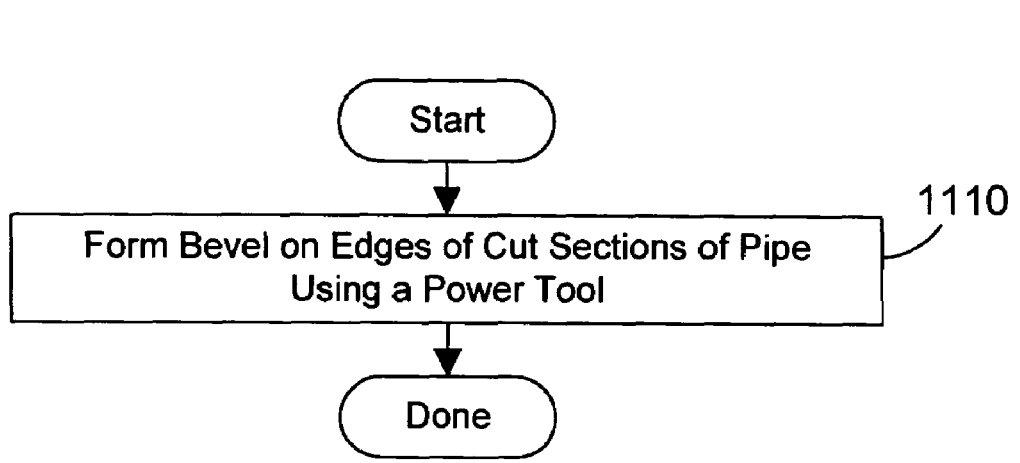
FIG. 11 is a flow diagram showing a second known implementation of step 940 in FIG. 9.

Two known ways of beveling pipe ends are shown in FIGS. 10 and 11, which show known implementations for step 940 in FIG. 9. In step 1010 of FIG. 10, the repair person manually files the edges of the pipes using a flat file. This manual process is undesirable for a number of reasons. First, there may not be enough room on all sides of the pipe end to use a file to bevel the edges. This may require hand excavation around the pipe to make room for the file to do its work. Second, because the entire perimeter of the pipe edge must be filed, it is very difficult to get an even and consistent bevel. There may be sections that are much more steeply beveled than other sections. Third, this process requires significant time and arm strength to manually file the entire perimeter of four pipe edges to create the desired bevels.

A second known way of beveling pipe ends is shown in FIG. 11. In step 1110 in FIG. 11, a repair person may form the bevel on edges of the cut sections of pipe using a specialized power tool made for forming a pipe end. Examples of known power tools or power tool attachments for beveling the end of a pipe are shown in the following U.S. Patents: U.S. Pat. No. 4,955,165 to Brooks et al.; U.S.

Pat. No. 4,180,358 to Uribe; U.S. Pat. No. 3,744,356 to Slator et al.; U.S. Pat. No. 4,257,289 to Groothius; U.S. Pat. No. 3,875,832 to Mayfield; and U.S. Pat. No. 6,146,067 to Owens. With the exception of the Brooks et al. patent, all the other listed patents require something inside of the pipe as the bevel is created. Using a power tool to bevel the edges is potentially hazardous because a leak in a water pipe generally leads to water in the trench that is dug to expose the leak. Using a power tool that plugs in is a potential hazard because the electric motor of the tool could come in contact with the water if the tool slips out of the operator's hands, causing potential electrocution of the operator. Battery-operated cordless tools could be used, but known devices for beveling a pipe are complex and difficult to setup.

There are some known pipe beveling tools that are manually operated, and thus avoid the risk of electric shock when working in a water-filled hole. Two examples are shown in the following U.S. Patents: U.S. Pat. No. 3,872,748 to Bjalme et al.; and U.S. Pat. No. 3,540,329 to Gill. Both of these are relatively complex tools that include moving parts, and both include a portion that is placed inside of the pipe to hold the tool in place during the beveling operation. The handles of the Gill device are so long that substantial excavation would be required to use the Gill device in a trench to bevel the edges of a pipe that is mostly buried. With both of these hand-operated tools, it is likely that the setup time alone would exceed the time required to perform the beveling by hand with a file, so any advantage of using these tools would be minimal. What is needed is a way to simply and manually bevel the edge of a plastic pipe. The pipe beveling tool of the preferred embodiments provides a simple yet elegant solution to this problem. It has no moving parts, and does not require any part of the tool to enter the interior portion of the pipe.

Figure 1:
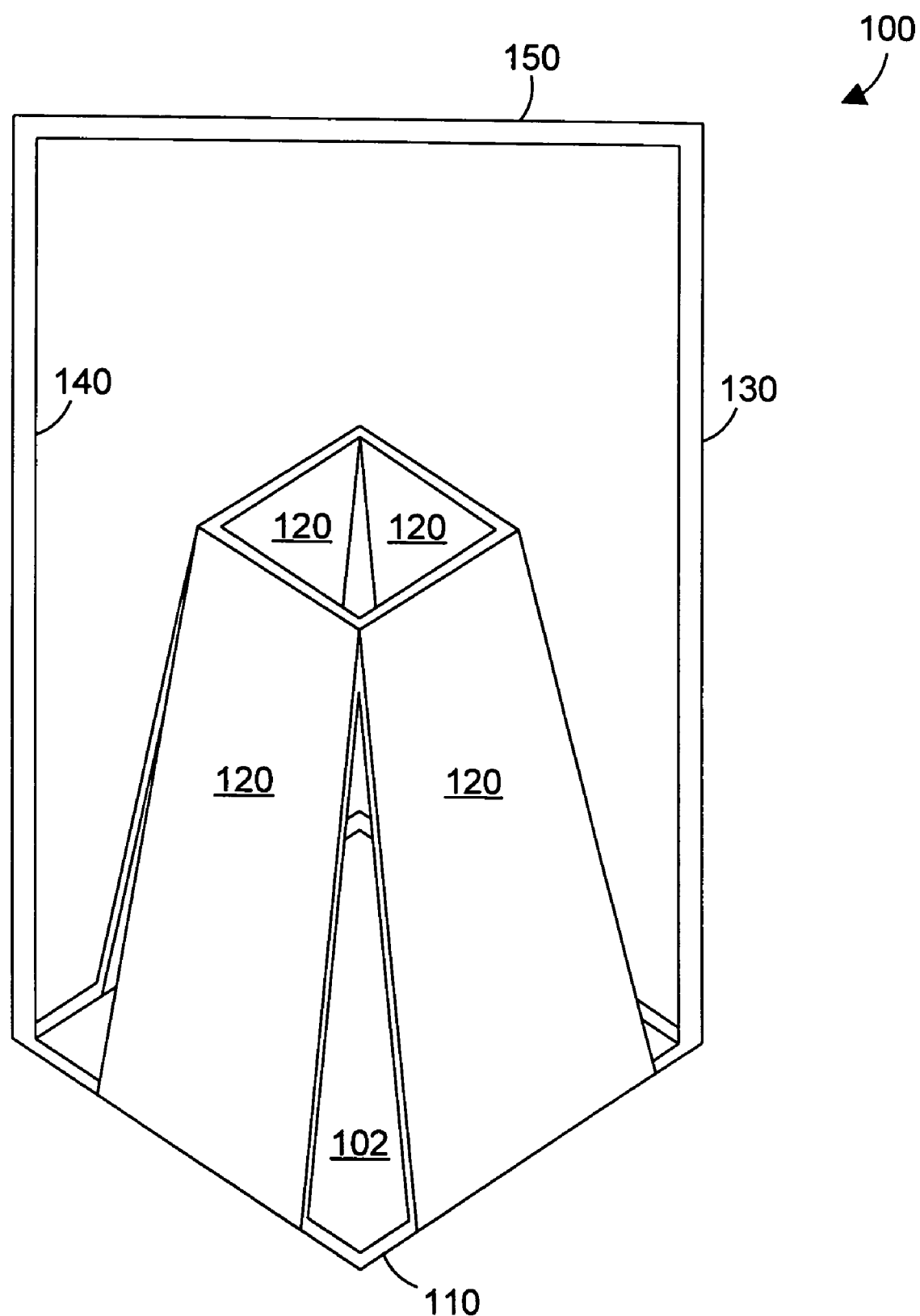
FIG. 1 is a perspective view of a pipe beveling tool in accordance with the preferred embodiments.
Figure 2:
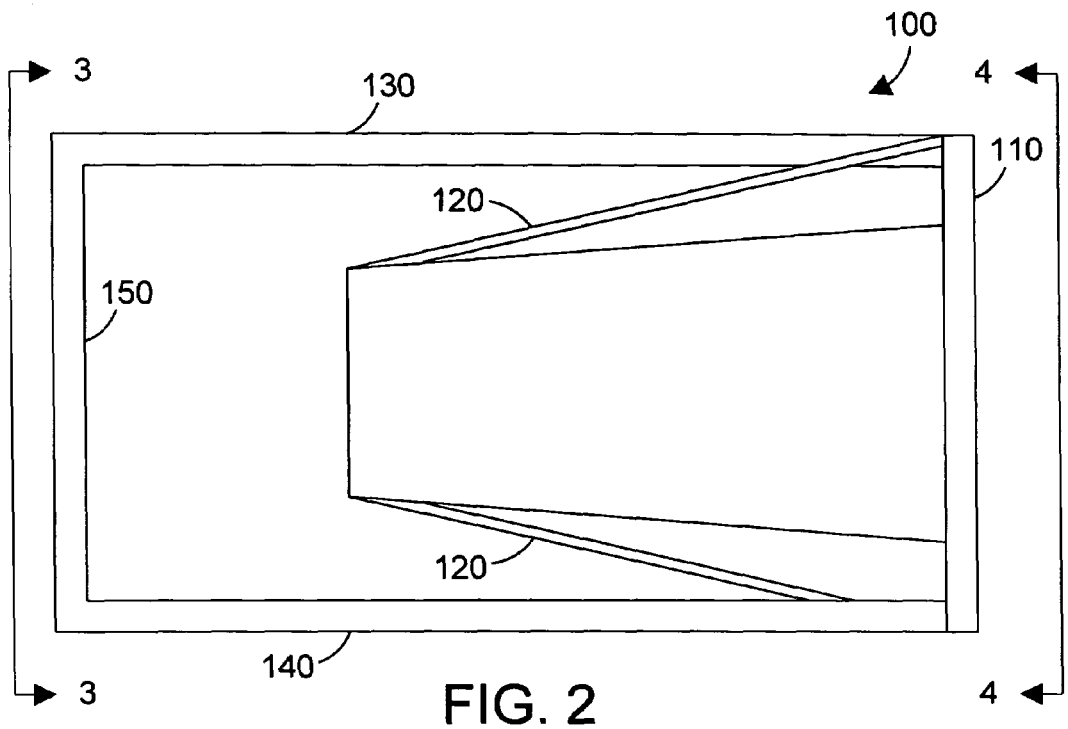
FIG. 2 is a side view of the pipe beveling tool of FIG. 1.
Figures 3, 4:
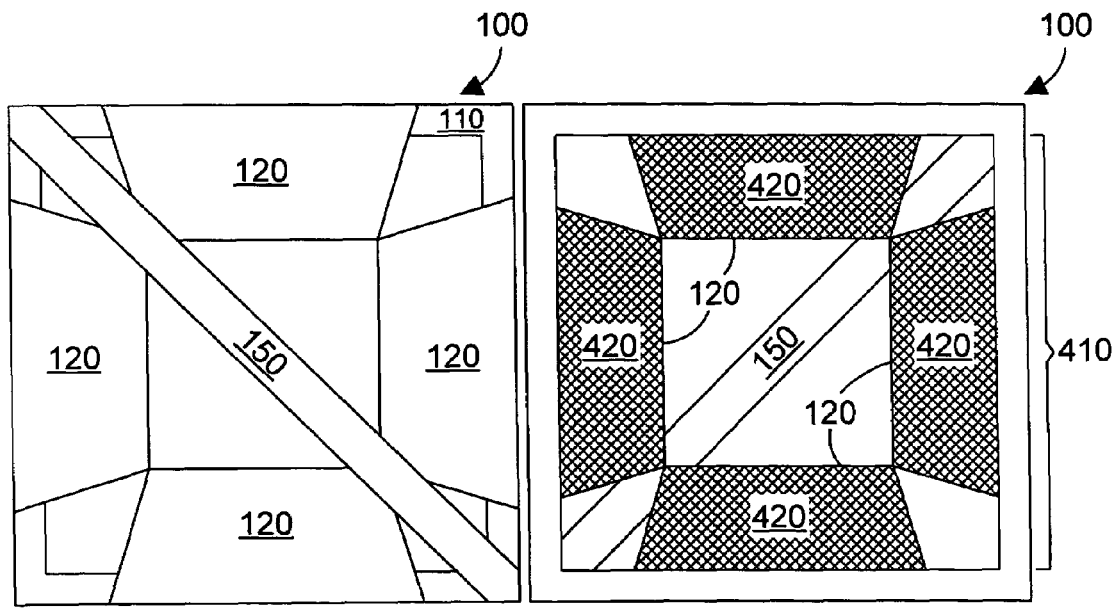
FIG. 3 is an end view of the pipe beveling tool of FIG. 1 taken along the line 3—3.
FIG. 4 is an end view of the pipe beveling tool of FIG. 1 taken along the line 4—4.

Referring to FIGS. 1–4, a pipe beveling tool 100 of the preferred embodiments includes a frame 110 that defines an opening 410 for receiving the end of a pipe, as shown in FIG. 4. The pipe beveling tool 100 includes one or more pipe forming members 120 coupled to the frame 110 at a predefined angle that determines the angle of the bevel on the pipe after using the pipe beveling tool to bevel the edges of an end of pipe. Two handles 130 and 140 are connected to the frame 110. These handles 130 and 140 provide holding points while manually using the tool 100. Handles 130 and 140 are most preferably connected together via a connecting piece 150. The result is a U-shaped handle that provides strength to the two handles and also provides an easy and convenient way to carry the tool 100.

FIG. 2 shows a side view of the tool 100. FIG. 3 shows an end view of the tool 100 in FIG. 2 taken along the lines 3—3. FIG. 4 shows an opposing end view of the tool 100 in FIG. 2 taken along the lines 4—4. The inside surfaces of the pipe forming members 120 are shown best in FIG. 4. The inside surface of each pipe forming member 120 includes a cutting surface 420. In the most preferred implementation, cutting surface 420 is an abrasive surface. In another alternative implementation, cutting surface 420 includes one or more blades. The specific example in FIG. 4 shows an abrasive surface for the cutting surface 420, such as would be found on the surface of a flat file or rasp. Another example of an abrasive surface is to have abrasive particles bonded to the pipe forming members 120, similar to sand paper. A cutting surface 420 allows quickly and easily beveling the edges of the end of a plastic pipe by manually rotating the tool 100 on the end of the plastic pipe, as shown in more detail in FIGS. 5–7.

The cutting surface 420 may include one or more blades in any suitable configuration. For example, blades with slots that allow the cut material to exit the cutting area of the tool are within the scope of the preferred embodiments. One can imagine such a blade arrangement by thinking of a conventional potato peeler. A slot in the pipe forming member 120 with a sharpened edge would serve to cut the edge of the pipe and allow the cut material to exit to the opposite side of the pipe forming member 120. Another possible implementation for the pipe forming member 120 is to include multiple small blades with corresponding holes, similar to a cheese grater. This configuration also allows the cut material to exit the pipe forming members. The preferred embodiments expressly extend to any and all surfaces that could be used to bevel the edges of an end of pipe, whether currently known or developed in the future.

Figure 5:
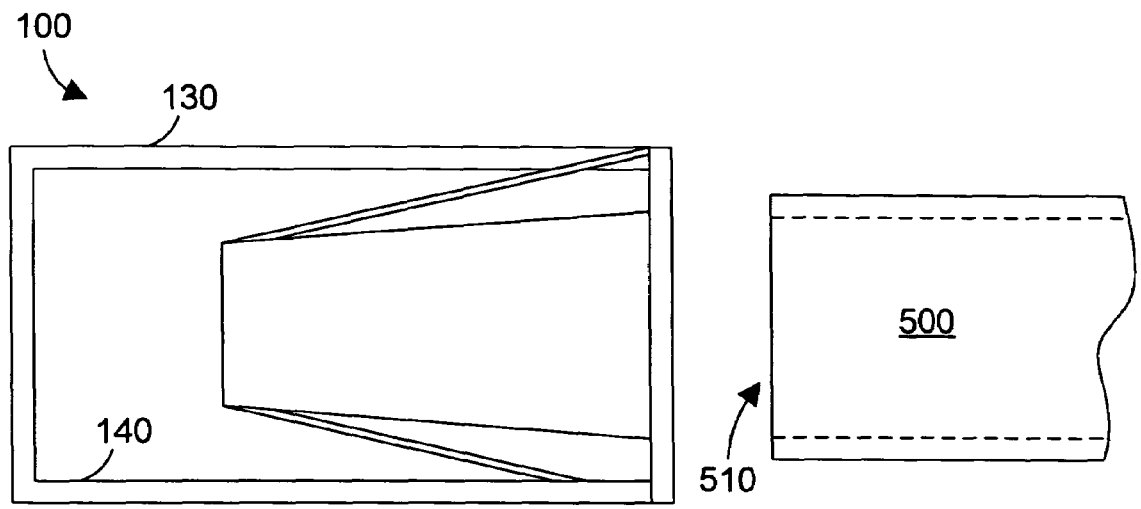
FIG. 5 is a side view showing the pipe beveling tool of FIGS. 1–4 being placed in position to bevel the edges of the end of a pipe.
Figure 6:
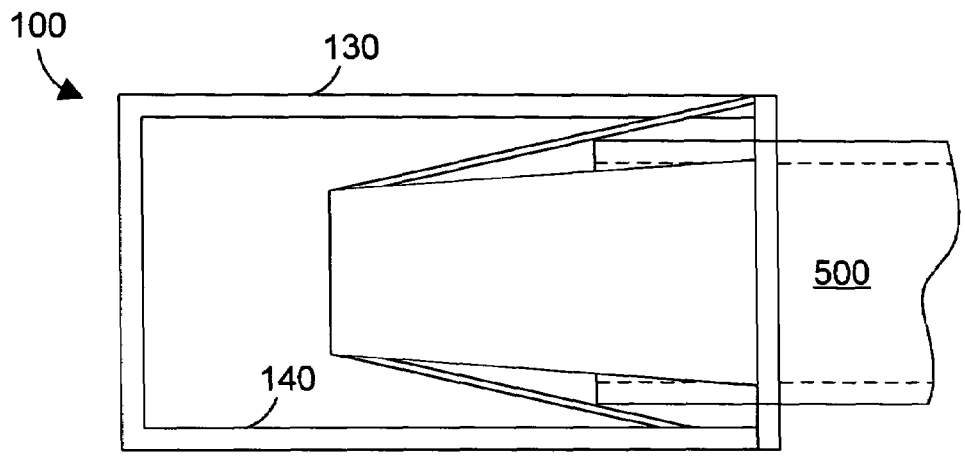
FIG. 6 is a side view of the pipe beveling tool in FIGS. 1–5 when placed in position for a user to bevel the edges of the end of the pipe.
Figure 7:
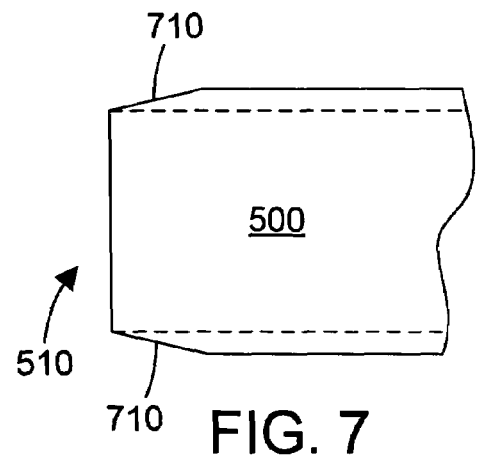
FIG. 7 is a side view of the end of pipe after the edges have been beveled using the pipe beveling tool of the preferred embodiments.

The tool 100 may be used to bevel the edges of an end of plastic pipe as illustrated in FIGS. 5–7. The pipe 500 includes side walls that have a thickness indicated by the dotted lines in FIGS. 5–7. The tool 100 is brought in proximity to the end 510 of pipe 500, with the opening 410 (see FIG. 4) facing the end 510. The tool is then moved forward until the end 510 contacts the pipe forming members, as shown in FIG. 6. Once in the position in FIG. 6, the operator of the tool 100 rotates the tool 100 manually via handles 130 and 140 while pushing the tool 100 on the end 510 of the pipe 500. In the most preferred operation of the tool 100, the tool 100 is rotated back and forth against the end 510. The operator may look at the progress of the beveling operation by stopping the rotation of the tool and looking through the gaps between the pipe forming members 120 to see if an adequate bevel has been obtained. In the alternative, the operator may remove the pipe beveling tool 100 from the end 510 of the pipe to see if an adequate bevel has been obtained. Once an adequate bevel has been obtained, the pipe beveling tool 100 is removed from the end 510 of the pipe 500, as shown in FIG. 7, with the result of a bevel 710 being formed on the edges of the end 510 of the pipe 500. While the bevel 710 in FIG. 7 is shown to extend across the full thickness of the side wall of the pipe 500, one skilled in the art will realize that the operator may stop beveling at any point, resulting in many different possible bevel profiles using the pipe beveling tool 100.

One of the significant advantages of the pipe beveling tool 100 of the preferred embodiments is that the tool is manually operated, which removes the risk of electric shock that arises when using a power tool. The angles of the pipe forming members 120 define the angle of the desired bevel on the pipe. Because these angles are fixed, the resulting bevel on the end 510 of the pipe 500 will be much more uniform than can be obtained using a flat file and filing around the perimeter of the pipe by hand. In addition, water pipes often have water still spilling out of them during the repair operation. The tool 100 includes gaps between the forming members 120, such as the gap 102 shown in FIG. 1. These gaps allow water to pass through the tool as the tool is being used to form the bevel on the pipe. In addition, the opening where the pipe forming members are joined together (e.g., the square opening at the top of the pipe forming members 120 in FIG. 1) provide another gap for water to pass through while using the tool 100 to bevel the end of a pipe.

The angled pipe forming members 120 shown in FIGS. 1–6 allow accommodating many different sizes of pipe. A smaller pipe will extend farther into the tool, and a larger pipe will not extend as far into the tool. By creating a single tool that accommodates different sizes of pipe, the person making the repair will not have to carry as many tools to repair different sizes of pipe.

Figure 8:
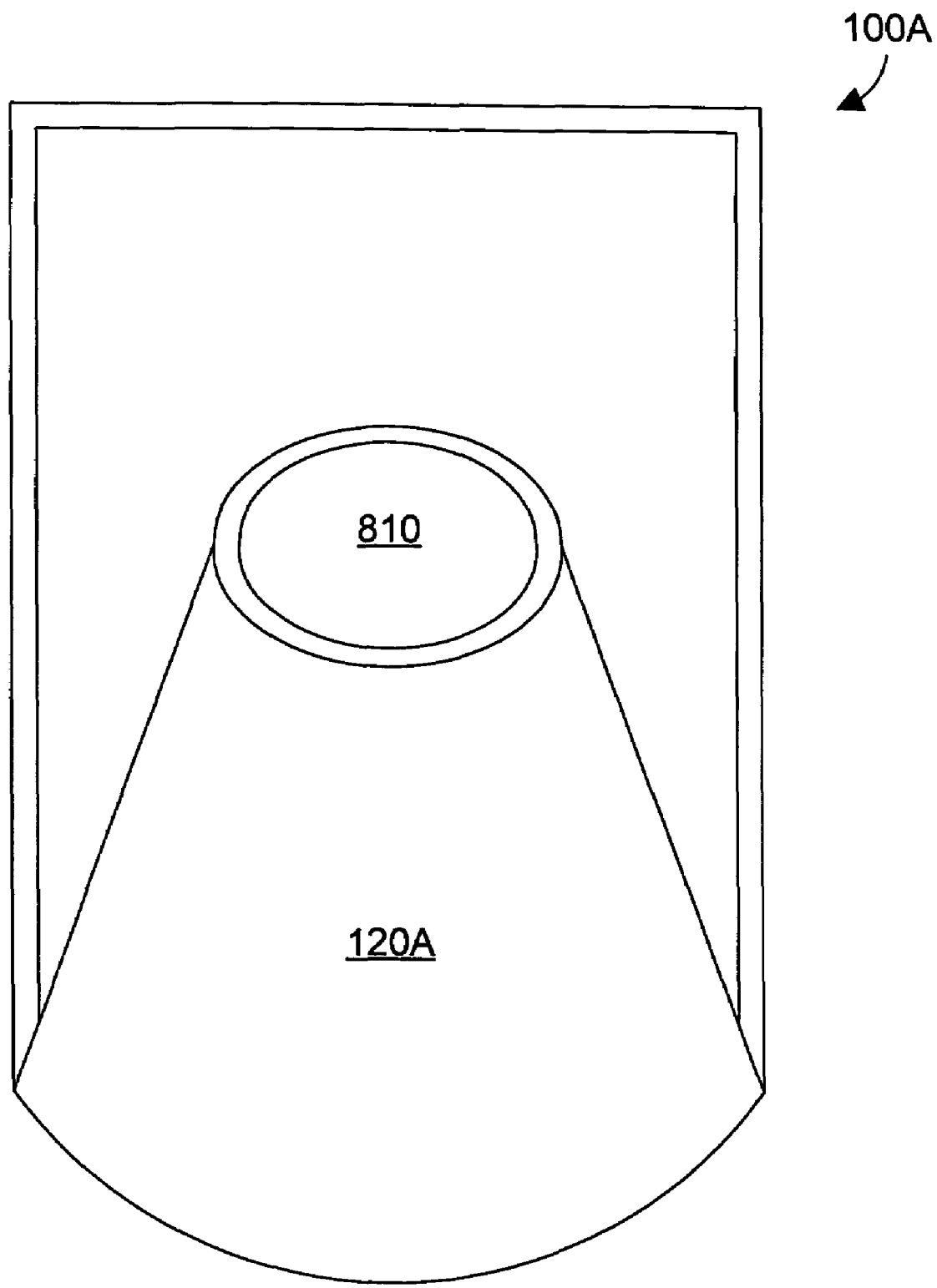
FIG. 8 is a perspective view of another possible configuration for the pipe beveling tool in accordance with the preferred embodiments.

Another possible implementation for the tool 100 is shown in FIG. 8 as tool 100A. The tool 100A includes a frustoconical pipe forming member 120A as shown. This member is preferably coupled to a circular frame (not shown) that defines an opening for receiving the end of a pipe that needs to be beveled. The narrow end of the frustoconical pipe forming member 120A includes an opening 810 that allows water or other liquid to pass while using the tool 100A to bevel a plastic pipe.

Figure 12:
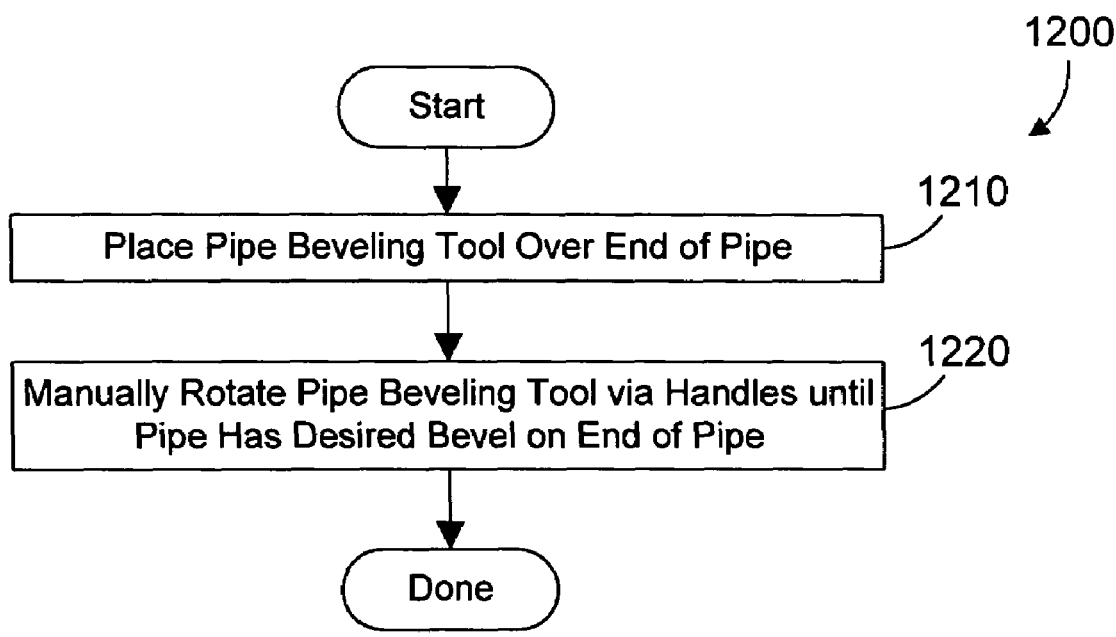
FIG. 12 is a flow diagram of a method for forming a bevel on the edges of a pipe in accordance with the preferred embodiments.

Referring now to FIG. 12, a method 1200 in accordance with the preferred embodiments shows a method for beveling a pipe using the tool 100 and 100A described above. The pipe beveling tool is placed over the end of the pipe (step 1210), as shown in FIG. 6. The pipe beveling tool is then manually rotated via the handles until the pipe has the desired bevel on the end (step 1220). The configuration of the pipe beveling tool allows the easy beveling of the end of a pipe without any part of the pipe beveling tool entering an interior portion of the pipe. This is in contrast to most of the known pipe forming tools, which typically include an arbor or mandrel that is placed inside of the pipe during the pipe beveling operation.

The pipe beveling tool of the preferred embodiments allows quickly forming a bevel on the end of a pipe. The handles make the tool easy to use manually, thereby making the use of a power tool unnecessary. In addition, the pipe beveling tool allows for achieving a more consistent bevel around the perimeter of the pipe because the angle of the pipe forming member(s) is fixed by the angle of attachment between the pipe forming member(s) and the frame.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the pipe forming members are shown in the drawings to be in a fixed orientation with respect to the frame. However, the preferred embodiments also extend to pipe forming members that are adjustable to different angles, so the operator may set the angle of the pipe forming members to a desired position to achieve a desired angle of bevel on the end of a pipe.

The invention claimed is:

1. A pipe beveling tool comprising:
   a frame that defines an opening for receiving an end of a pipe;
   at least one pipe forming member coupled to the frame that contacts the end of the pipe when the opening of the pipe beveling tool is placed over the end of the pipe, wherein each pipe forming member comprises a substantially flat plate having an abrasive surface disposed at a predefined angle with respect to the frame opening; and
   at least one handle coupled to the frame that allows a user to manually rotate the pipe beveling tool to form a bevel on the end of the pipe.

2. The pipe beveling tool of claim 1 wherein the handle comprises a U-shape having two ends that are each coupled to opposing sides of the frame.

3. A method for forming a bevel on an end of a pipe, the method comprising the steps of:

(A) placing an opening of a pipe beveling tool over the end of the pipe, the pipe beveling tool comprising:
   a frame that defines an opening for receiving the end of the pipe, the opening defining a substantially flat plane;
   a plurality of substantially flat plates that are each coupled to the frame at a predefined angle with respect to the plane of the opening, each plate including a pipe forming surface facing the opening, wherein each of the plurality of substantially flat plates have a first end coupled to the frame and a second end coupled to at least one other of the plurality of substantially flat plates; and
   at least one handle coupled to the frame; and
(B) manually rotating the pipe beveling tool while pressing the pipe beveling tool against the end of the pipe to form a bevel on the end of the pipe.

4. The method of claim 3 wherein no portion of the pipe beveling tool enters an interior portion of the end of the pipe during steps (A) and (B).

5. A pipe beveling tool comprising:
   a frame that defines an opening for receiving an end of a pipe, the opening defining a substantially flat plane; and
   a plurality of substantially flat plates that are each coupled to the frame at a predefined angle with respect to the plane of the opening, each plate including a pipe forming surface facing the opening, wherein each of the plurality of substantially flat plates have a first end coupled to the frame and a second end coupled to at least one other of the plurality of substantially flat plates.

6. The pipe beveling tool of claim 5 further comprising:
   a first handle coupled to the frame and extending at an angle substantially normal to the plane of the opening; and
   a second handle coupled to the frame at a position substantially opposite the first handle at an angle substantially normal to the plane of the opening.

7. The pipe beveling tool of claim 1 further comprising at least one gap adjacent to the at least one pipe forming member.

8. The pipe beveling tool of claim 1 wherein the frame opening and at least one pipe forming member are sized to accommodate a plurality of pipe diameters.

9. The pipe beveling tool of claim 1 wherein the pipe beveling tool includes no parts that move with respect to any other part of the pipe beveling tool during the beveling of a pipe using the pipe beveling tool.

10. The pipe beveling tool of claim 1 wherein no portion of the pipe beveling tool enters an interior portion of the end of the pipe when the user uses the pipe beveling tool to form the bevel on the end of the pipe.

11. The pipe beveling tool of claim 5 wherein the pipe beveling tool includes no parts that move with respect to any other part of the pipe beveling tool during the beveling of a pipe using the pipe beveling tool.

12. The pipe beveling tool of claim 6 wherein the first handle is coupled to the second handle.

13. The pipe beveling tool of claim 5 wherein the pipe forming surface comprises an abrasive surface.

14. The pipe beveling tool of claim 5 wherein the pipe forming surface comprises at least one blade.

15. The pipe beveling tool of claim 5 further comprising at least one gap adjacent to the at least one pipe forming surface.

16. The pipe beveling tool of claim 5 wherein the frame opening and at least one pipe forming member are sized to accommodate a plurality of pipe diameters.

* * * * *